United States Patent
Schroeder et al.

(10) Patent No.: US 12,291,080 B2
(45) Date of Patent: May 6, 2025

(54) METHOD FOR MAXIMIZING A REFRIGERANT IN ACTIVE SYSTEM SECTIONS OF A REFRIGERATION SYSTEM, REFRIGERATION SYSTEM, AND MOTOR VEHICLE COMPRISING SUCH A REFRIGERATION SYSTEM

(71) Applicant: AUDI AG, Ingolstadt (DE)

(72) Inventors: Dirk Schroeder, Manching (DE); Christian Rebinger, Munich (DE); Thomas Haltmeier, Ingolstadt (DE); Stephen Rost, Manching (DE)

(73) Assignee: Audi AG, Ingolstadt (DE)

( * ) Notice: Subject to any disclaimer, the term of this patent is extended or adjusted under 35 U.S.C. 154(b) by 151 days.

(21) Appl. No.: 18/005,233

(22) PCT Filed: Aug. 27, 2021

(86) PCT No.: PCT/EP2021/073694
§ 371 (c)(1),
(2) Date: Jan. 12, 2023

(87) PCT Pub. No.: WO2022/083924
PCT Pub. Date: Apr. 28, 2022

(65) Prior Publication Data
US 2023/0264537 A1 Aug. 24, 2023

(30) Foreign Application Priority Data
Oct. 23, 2020 (DE) .......................... 102020127905.1

(51) Int. Cl.
*B60H 1/32* (2006.01)
*B60H 1/00* (2006.01)

(52) U.S. Cl.
CPC ..... *B60H 1/00921* (2013.01); *B60H 1/00485* (2013.01); *B60H 1/00571* (2013.01); *B60H 2001/3248* (2013.01)

(58) Field of Classification Search
CPC ............ B60H 1/00485; B60H 1/00571; B60H 1/00921; B60H 2001/3248
See application file for complete search history.

(56) References Cited

PUBLICATIONS

DE 10 2018213232 English Translation (Year: 2018).*

* cited by examiner

*Primary Examiner* — Jonathan Bradford
(74) *Attorney, Agent, or Firm* — Maier & Maier, PLLC

(57) ABSTRACT

A method for operating a refrigeration system for a motor vehicle. The method includes setting an operating mode of the refrigeration system having active primary line and inactive secondary line or having active secondary line and inactive primary line; detecting the pressure in the inactive line; and activating and extraction of refrigerant from the inactive line into the active line by lowering the pressure in the active line to a value below the pressure in the inactive line and by opening the relevant valve device.

11 Claims, 2 Drawing Sheets

METHOD FOR MAXIMIZING A REFRIGERANT IN ACTIVE SYSTEM SECTIONS OF A REFRIGERATION SYSTEM, REFRIGERATION SYSTEM, AND MOTOR VEHICLE COMPRISING SUCH A REFRIGERATION SYSTEM

FIELD

The invention relates to a method for maximizing a refrigerant in active system sections of a refrigeration system for a motor vehicle, a refrigeration system, and a motor vehicle comprising such a refrigeration system.

BACKGROUND

A refrigeration system, which in particular can also have a heat pump function, usually comprises a refrigerant compressor which is connectable or connected to a primary line and a secondary line; a directly or indirectly acting external heat exchanger, which is arranged in the primary line; an evaporator, which is arranged in the primary line; at least one further heat exchanger acting as a heat source, in particular a heating register, which is arranged in the secondary line; a primary line valve arranged between the refrigerant compressor and the external heat exchanger; a secondary line valve arranged between the refrigerant compressor and the at least one further heat exchanger, in particular the heating register.

Refrigeration systems in which refrigerant can flow from an inactive area or line into an active area or line are known, for example, from DE 10 2011 118 162 A1 or DE 10 2019 201 427 A1. A refrigeration system is known from DE 10 2013 019 498 A1, in which calculation models are used for refrigerant management. In the known refrigeration systems, refrigerant is withdrawn from an inactive area due to the working pressures that usually occur during operation, without this aspect being particularly important.

It has been shown that in refrigeration systems which are operated as in the cited documents of the prior art, the active refrigerant quantity can be monitored too little, so that cases can occur in which the refrigeration system or the system can be operated underfilled (in the active area or line), which can results in losses in the performance of the refrigeration system in the different operating states.

SUMMARY

The object on which the invention is based is seen as specifying a method in which the refrigerant management is optimized, in particular taking into consideration different operating states of the refrigeration system.

This object is achieved by a method, a refrigeration system, and a motor vehicle.

A method for operating a refrigeration system for a motor vehicle is therefore proposed, wherein the refrigeration system comprises: a refrigerant compressor which is connectable or connected to a primary line and a secondary line; a directly or indirectly acting external heat exchanger, which is arranged in the primary line; an evaporator, which is arranged in the primary line; at least one further heat exchanger acting as a heat source, in particular a heating register, which is arranged in the secondary line; a primary line valve arranged between the refrigerant compressor and the external heat exchanger; a secondary line valve arranged between the refrigerant compressor and the at least one further heat exchanger, in particular the heating register, which represents a heat source; at least one valve device, which is arranged between a high-pressure-side section of the primary line or the secondary line and a low-pressure-side line section located upstream of the refrigerant compressor.

It comprises the following steps:

Setting an operating mode of the refrigeration system having active primary line and inactive secondary line or having active secondary line and inactive primary line; detecting the pressure in the inactive leg; activating an extraction of refrigerant from the inactive line into the active line by lowering the pressure in the active line to a value below the pressure in the inactive line and by opening the relevant valve device.

By detecting the pressure in the inactive line or section of the refrigeration system, the activation of an extraction of refrigerant from the inactive line can be implemented in a targeted manner, wherein a lowering of the pressure in the active line can be implemented in a targeted manner. It is to be noted that the term used here of detection or detecting the pressure can be a direct pressure measurement or an indirect estimation of the pressure, in particular based on other parameters such as refrigerant temperature, refrigerant properties, other operating parameters of the refrigeration system, for example of the refrigerant compressor. The term detection/detecting thus means obtaining a pressure value that can be based on a specific measurement or that is derived or calculated or estimated on the basis of further parameters.

In the method, the pressure in the active line can be reduced starting from a working pressure level that is higher than the pressure in the inactive line. This makes it possible, at least briefly, to reduce the pressure in the active line to such an extent that refrigerant can be extracted from the inactive line in order to maximize the amount of refrigerant in the active area of the refrigeration system before subsequently returning again to the actual working pressure level.

In the method, the pressure in the active line can be reduced further starting from a working pressure level that is higher than the pressure in the inactive line. This makes it possible to additionally lower the pressure in the active line, at least briefly, in order to accelerate the extraction of refrigerant from the inactive line or to maximize the amount of refrigerant in the active area.

In order to ensure the operation of the refrigeration system and its performance in any case when the extraction of refrigerant from the inactive line is activated, the pressure in the active line can be kept at a pressure level that corresponds to a low-pressure limit permissible for the refrigeration system.

In the method, the pressure value detected or estimated in the inactive line can be compared to the static pressure resulting when the ambient temperature is applied or refrigerant/fluid temperature is applied, wherein the activation of the extraction of refrigerant from the inactive line then takes place when the detected pressure is greater than or equal to the static pressure resulting at ambient temperature.

An extraction requirement can be ascertained or recognized or predicted in particular via pressure sensors mounted in the inactive line or dead volume. If the pressure value detected in these inactive lines or segments is (permanently) below the static pressure resulting at ambient temperature or coolant/fluid temperature, this strand is already extracted and only refrigerant in the gas phase is still present. If the pressure value detected in these inactive lines or segments is at or above the level of the static pressure resulting at ambient temperature or coolant/fluid temperature, this line or sector has not yet been extracted and refrigerant is present as a 2-phase mixture or possibly also in liquid form. The relationship between (ambient/fluid) temperature and refrigerant pressure can be derived, for example, from a material data table for an employed refrigerant.

In the method, activating the extraction of refrigerant from the inactive line can take place when the refrigeration system is started or when the refrigeration system is restarted, in order to maximize the amount of refrigerant in the active line. This makes it possible to bring the refrigeration system to optimum performance very quickly in a specific operating mode and to positively influence the amount of refrigerant in the active line already at the beginning of operation.

A refrigeration system, in particular having a heat pump function, for a motor vehicle is also proposed, wherein the refrigeration system comprises:

a refrigerant compressor which is connectable or connected to a primary line and a secondary line; a directly or indirectly acting external heat exchanger, which is arranged in the primary line; an evaporator, which is arranged in the primary line; at least one further heat exchanger acting as a heat source, in particular a heating register, which is arranged in the secondary line; a primary line valve arranged between the refrigerant compressor and the external heat exchanger; a secondary line valve arranged between the refrigerant compressor and the at least one further heat exchanger, in particular the heating register, which represents a heat source; at least one valve device, which is arranged between a high-pressure-side section of the primary line or the secondary line and a low-pressure-side line section located upstream of the refrigerant compressor; and at least one pressure sensor or pressure/temperature sensor, which is arranged in the relevant high-pressure-side section of the primary line with the secondary line and is configured to detect the pressure in the inactive line in an operating state having active primary line and inactive secondary line or having active secondary line and inactive primary line The refrigeration system can comprise a control unit configured to carry out the above-described method.

A motor vehicle, in particular an at least partially electrically operated motor vehicle, can have an above-described refrigeration system. In an electric vehicle, the efficient operation of the refrigeration system can result in power savings, so that a greater range of the electric vehicle can be achieved as a result.

It is generally noted that the above-described method can be used for any type of refrigeration system that has a system that has segmentable sections. The method can therefore be used both for a pure refrigeration system and for a system having a heat pump and/or reheat function, so that advantages linked thereto can be positively utilized in an essentially deliberate manner A refrigeration system can be seen as the simplest variant, for example, which has a second evaporator line in the form of a chiller or evaporator subjected to air, wherein the additional or second line can be represented as segmentable.

BRIEF DESCRIPTION OF THE FIGURES

Further advantages and details of the invention result from the following description of embodiments with reference to the figures. In the figures.

DETAILED DESCRIPTION

Figure 1:
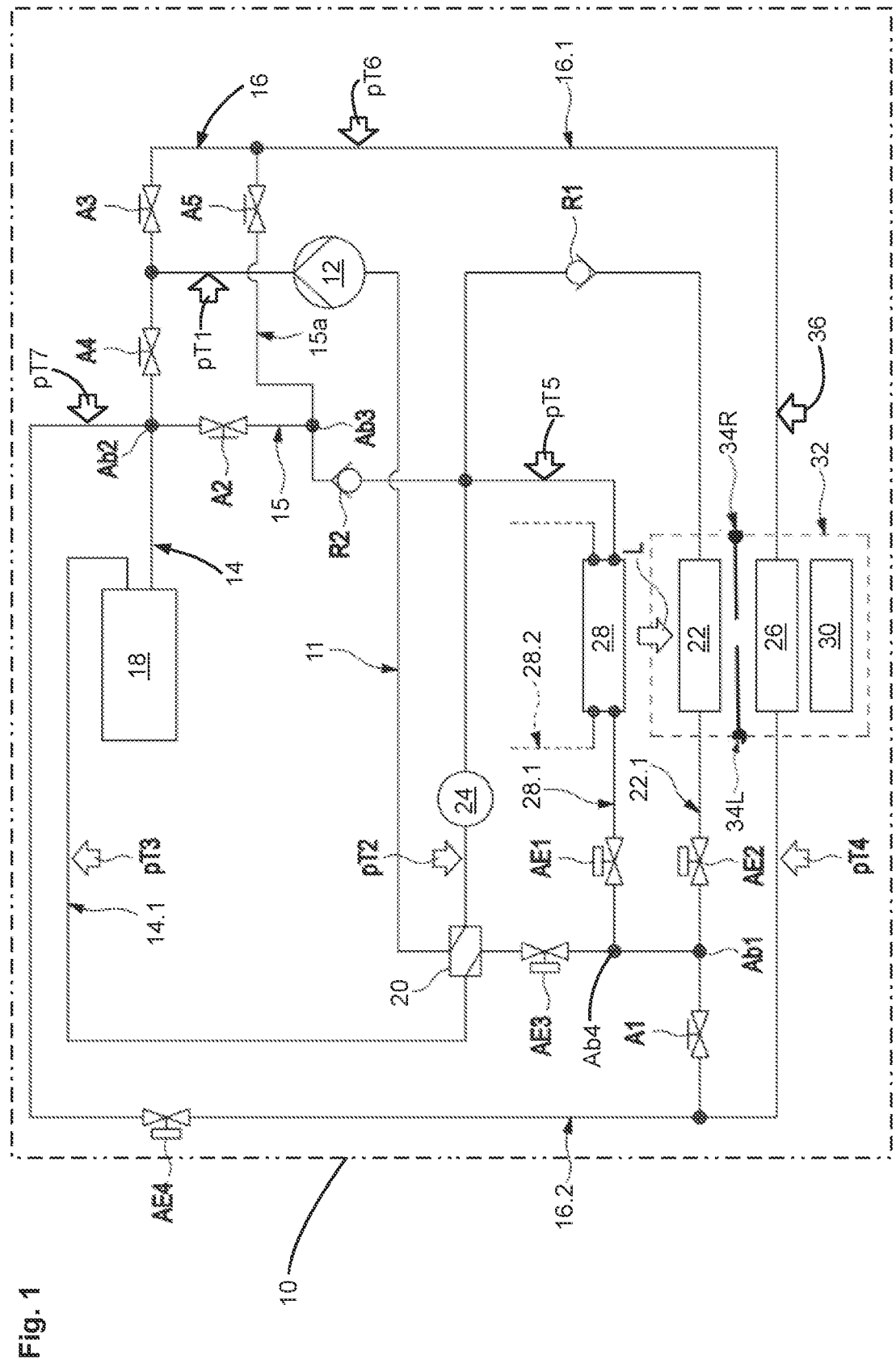
FIG. 1 shows a schematic and simplified circuit diagram of a refrigeration system for a motor vehicle.

FIG. 1 shows an embodiment of a refrigeration system 10 for a motor vehicle in a schematic and simplified manner. The refrigeration system 10 comprises a refrigerant circuit 11, which can be operated both in a refrigeration system operation (also called AC operation for short) and in a heat pump mode. In the embodiment shown, the refrigeration system 10 comprises a refrigerant compressor 12, an external heat exchanger 18, an internal heat exchanger 20, an evaporator 22 and an accumulator or refrigerant collector 24. The external heat exchanger 18 can be designed as a condenser or gas cooler. In particular, the external heat exchanger 18 can have flow through it in both directions in the illustrated embodiment.

The evaporator 22 is shown here by way of example as a front evaporator for a vehicle. The evaporator 22 is also representative of other evaporators possible in a vehicle, for example rear evaporators, which can be arranged fluidically in parallel to one another. In other words, the refrigeration system 10 comprises at least one evaporator 22.

A shut-off valve A4 is arranged downstream of the compressor 12. An expansion valve AE2 is provided upstream of the evaporator 22.

In the scope of this description, the section from the compressor 12 to the outer heat exchanger 18, to the inner heat exchanger 20, and to the evaporator 22 is referred to as the primary line 14 in the entire refrigerant circuit 11 of the refrigeration system 10.

The refrigeration system 10 furthermore comprises a heating register 26 (also referred to as a heating condenser or heating gas cooler). A shut-off valve A3 is arranged upstream of the heating register 26. A shut-off valve A1 is arranged downstream of the heating register 26. Furthermore, an expansion valve AE4 is arranged downstream of the heating register 26.

In the scope of this description, the section from the compressor 12 to the heating register 26, to the expansion valve AE4 and to a branch Ab2 is referred to as the secondary line 16 in the entire refrigerant circuit of the refrigeration system 10. The secondary line 16 comprises a heating branch 16.1, which extends from the shut-off valve A3 via the heating register 26 to the shut-off valve A1. The secondary line 16 also includes a reheating branch or reheat branch 16.2, which is fluidically connectable to the heating register 26 upstream and to the external heat exchanger 18 downstream. The secondary line 16 or the reheat branch 16.2 opens into the primary line 14 at a branching point Ab2.

The refrigeration system 10 comprises a further evaporator or chiller 28. The chiller 28 is provided fluidically in parallel to the evaporator 22. The chiller 28 can be used, for example, to cool an electrical component of the vehicle, but also to implement a water heat pump function using the waste heat from at least one electrical component. An expansion valve AE1 is connected upstream of the chiller 28.

The refrigeration system 10 can also have an electrical heating element 30, which is designed, for example, as a high-voltage PTC heating element. The electric heating element 30 is used as an auxiliary heater for a supply air flow L guided into the vehicle interior. The electric heating element 30 can be accommodated in an air conditioning unit 32 together with the heating register 26 and the evaporator 22. In this case, the electrical heating element 30 can be arranged downstream of the heating register 26.

Check valves R1 and R2 are also apparent in FIG. 1. Furthermore, several sensors pT1 to pT5 for detecting pressure and/or temperature of the refrigerant are also shown. It is to be noted that the number of sensors and their arrangement is only shown here as an example. A refrigeration system 10 can also have fewer or more sensors. In the example shown, combined pressure/temperature sensors pT1 to pT5 are shown as the sensors. However, it is just as conceivable that sensors that are separate from one another are used for measuring pressure or temperature and, if necessary, are also arranged spatially separately from one another along the refrigerant lines.

The refrigeration system 10 can be operated in different modes, which are briefly described below.

In AC operation of the refrigerant circuit 11, the refrigerant compressed to high pressure flows from the refrigerant compressor 12 when the shut-off valve A4 is open into the outer heat exchanger 18. From there it flows to the high-pressure section of the internal heat exchanger 20 and the fully open expansion valve AE3. The refrigerant can flow to the expansion valve AE2 and into the interior evaporator 22 via a branching point Ab1 (evaporator section 22.1). In parallel or alternatively, the refrigerant can flow into the chiller 28 (chiller section 28.1) via a branching point Ab4 and the expansion valve AE1. From the evaporator 22 and/or the chiller 28, the refrigerant flows on the low-pressure side into the collector 24 and through the low-pressure section of the internal heat exchanger 20 back to the compressor 12.

In AC operation, the heating branch 16.1 or the secondary line 16 is shut off by means of the shut-off valve A3, so that hot refrigerant cannot flow through the heating register 26. To retrieve refrigerant from the inactive heating branch 16.1, the shut-off element A5, which is designed as a shut-off valve, can be opened so that the refrigerant can flow in the direction of the collector 24 via the shut-off element A5 and the check valve R2, with the shut-off element A2 being closed at the same time.

In heating operation of the refrigerant circuit 11, the shut-off valve A4 is closed and the shut-off valve A3 is open, so that hot refrigerant can flow into the heating branch 16.1.

To carry out the heating function by means of the chiller 28 to implement water heat pump operation, the refrigerant compressed by means of the refrigerant compressor 12 flows into the heating register 26 via the open shut-off valve A3. At the heating register 26, heat is given off to a supply air flow L guided into the vehicle interior. The refrigerant then flows via the open shut-off valve A1 and the branching point Ab1. It is expanded by means of the expansion valve AE1 in the chiller 28 to absorb waste heat from electrical and/or electronic components arranged in a coolant circuit 28.2. With this heating function, the expansion valves AE3 and AE4 are closed, the shut-off valve A5 is closed, and the shut-off valve A2 is open. In this case, refrigerant displaced in water heat pump operation can be extracted via the shut-off valve A2 out of a bidirectional line 14.1 or the primary line 14 and supplied to the collector 24 via the check valve R2.

To carry out the heating function by means of the external heat exchanger 18 as a heat pump evaporator, the refrigerant compressed by means of the refrigerant compressor 12 flows via the open shut-off valve A3 to give off heat to a supply air flow L into the heating register 26. It is then expanded via the open shut-off valve A1 by means of the expansion valve AE3 in the outer heat exchanger 18 to absorb heat from the ambient air. The refrigerant then flows via a heat pump return branch 15 to the collector 24 and back to the refrigerant compressor 12. The expansion valves AE1, AE2, and AE4 remain closed, as does the shut-off valve A5.

An indirect delta connection can be implemented in that when the shut-off valve A1 is open, the refrigerant compressed by the refrigerant compressor 12 is expanded by means of the expansion valve AE1 in the chiller 28, wherein no mass flow is generated at the same time on the coolant side, i.e., in the coolant circuit 28.2, thus, for example, the fluid used as the coolant, such as water or water-glycol mixture, remains on the coolant side of the chiller 28 or coolant does not actively flow through the chiller 28. The expansion valves AE2, AE3, and AE4 remain closed in this switching variant.

In a reheating or reheat operation, the supply air flow L supplied into the vehicle interior is first cooled by means of the evaporator 22 and thus dehumidified. Using the heat transferred to the refrigerant by evaporation and dehumidification and the heat supplied to the refrigerant via the compressor 12, the supply air flow L can be completely or at least partially reheated by means of the heating register 26.

For this purpose, the refrigeration system 10, in particular the air conditioning unit 32, has adjustable, in particular controllable and pivotable, temperature flaps 34 between the evaporator 22 and the heating register 26. In the example shown, a left and a right temperature flap 34L and 34R (shown schematically in FIG. 1) are arranged. The temperature flaps 34L, 34R can be adjusted or pivoted between an open position, designated as a 100% position, and a closed position, designated as a 0% position. Alternatively, it is also possible to connect the temperature flaps 34R, 34L downstream of the heating register 26.

In the 100% position, the entire supply air flow L flowing through the evaporator 22 is guided and heated via the heating register 26 before it can flow into the passenger compartment of the vehicle. In the 0% position the entire supply air flow L flowing through the evaporator 22 flows in the bypass around the heating register 26 without heating and thus without absorbing heat into the passenger compartment.

In an x position of the temperature flaps 34L and 34R with 0%<x<100%, these temperature flaps are only partially open, so that in each case only a partial air flow of the supply air flow L flowing through the evaporator 22 is guided via the heating register 26. This heated partial air flow can then be mixed with the remaining, cooled and dehumidified partial air flow. The supply air flow L heated in this way is supplied to the passenger compartment of the vehicle. As an example, a 50% position indicates that the temperature flaps 34R and 34L are only half open, i.e., 50%.

The refrigeration system 10 has a sensor device 36 in the secondary line 16 downstream of the secondary line valve A3 and upstream of the heating register 26, which is configured to detect a hot gas temperature value representing the temperature of the gaseous refrigerant upstream of the heating register 26. The hot gas temperature value can be measured or detected directly or also estimated indirectly based on other system parameters. For example, it is conceivable to determine a pressure in the secondary line 16 by means of the sensor device 36 and to draw conclusions about the hot gas temperature value therefrom. The sensor device 36 can, for example, be solely a temperature sensor or a combined temperature/pressure sensor.

The method proposed here can in principle be used in each of the above-described operating modes, for example AC operation, heating operation with/without integration of heat pump function in each case, wherein it is presumed that refrigerant does not actively flow through either the primary line 14 or the secondary line 16, thus they are inactive when the primary line valve A4 or secondary line valve A3 is closed, respectively.

It is apparent from FIG. 1 that the shut-off valve A2 is provided in the line section 15 The shut-off valve A2 is arranged on the high-pressure side in the primary line 14, wherein the line section 15 connects the primary line 14 to the low-pressure side of the refrigerant circuit 11 upstream of the refrigerant compressor 12.

Furthermore, the shut-off valve A5 is provided in the line section 15a. The shut-off valve A5 is arranged on the high-pressure side in the secondary line 16, wherein the line section 15a connects the secondary line 16 to the low-pressure side of the refrigerant circuit 11 upstream of the refrigerant compressor 12.

In order to be able to determine the pressure in each case in an inactive line 14, 16 or region of the refrigerant circuit 11, the primary line 14 and the secondary line 16 are assigned respective sensor devices pT6 and pT7. The sensor devices pT6, pT7 can be pressure sensors or pressure/temperature sensors. The respective pressure sensors pT6, pT7 are each arranged downstream of the primary line valve A4 and the secondary line valve A3. In relation to a normal flow direction of refrigerant, they are therefore located behind the respective shut-off device A3, A4, which is used for activating or deactivating the relevant line 14, 16.

The method 500, which can be carried out for the targeted extraction of refrigerant out of inactive areas of the refrigeration system 10, is described in more detail hereinafter with reference to FIG. 2.

Figure 2:
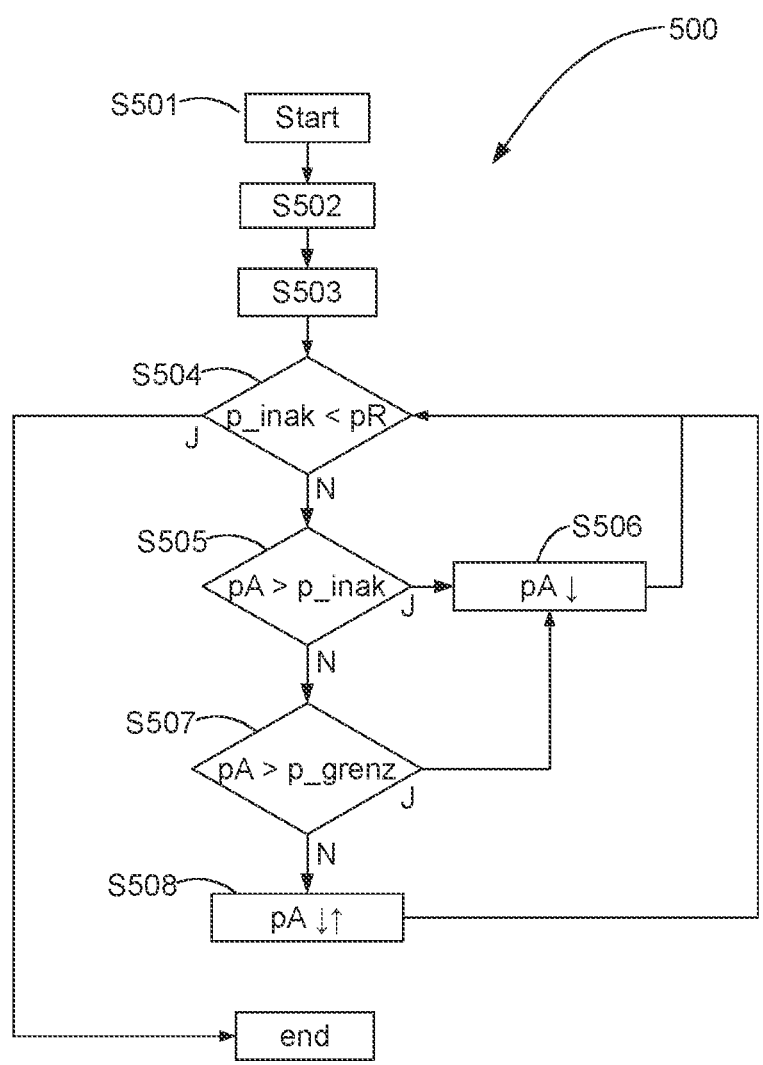
FIG. 2 shows a flow chart of an exemplary implementation of the method, in particular by means of the refrigeration system described in FIG. 1.

According to the method 500 shown in FIG. 2, in operation after the start (S501) of the refrigeration system 10, switching to a desired or suitable operation takes place, which is illustrated by step S502. According to a step S503, the pressure p_inak in an inactive line or area of the refrigeration system 10 is detected. In step S504 it is checked whether the detected pressure value p_inak is less than the static pressure pR resulting at ambient temperature. If the pressure p_inak in the relevant line 14, 16 is less than the static pressure pR, the method is ended, since no further extraction from the inactive line 14, 16 is necessary or possible. If the detected pressure p_inak is greater than or equal to the static pressure pR, it is checked according to step S505 whether the working pressure pA on the low-pressure side of the refrigerant circuit 11 is greater than the pressure p_inak detected in the inactive line 14, 16.

When the working pressure pA is greater than the pressure p_inak, according to step S506, the working pressure pA is actively lowered to a value that is lower than the pressure p_inak. For this purpose, the components of the relevant line 14, 16 through which flow actively occurs, in particular associated valve devices such as expansion valves AE1, AE2, AE3, but also the compressor 12, can be actively activated such that a lower working pressure pA temporarily results. If the working pressure pA is lower than the pressure p_inak, according to step S507, a check is made as to whether the working pressure pA is greater than a low-pressure limit p_grenz. If the working pressure pA is greater than the low-pressure limit p_grenz, the working pressure pA is actively lowered further (S506) or can be lowered further (S506). If the working pressure pA reaches the low-pressure limit p_grenz, there is no further active reduction in the working pressure pA and the working pressure is regulated to a suitable value (S508) or kept at the low-pressure limit p_grenz, which is illustrated by the two arrows pointing downwards. Even if this is not explicitly shown in the course of the method, the method 500 naturally also includes the opening of a relevant valve device, in particular the shut-off valve A2 or A5, at a suitable point in order to be able to establish the extracting connection between the low-pressure side and the inactive line 14 or 16.

The combination of the condition in S505 and step S506, i.e., a targeted reduction in the working pressure pA, if this would actually be higher in normal operation than the pressure p_inak in the inactive line, can be referred to or understood as the first mode of active extraction of refrigerant. The first mode thus results in forced extraction, because in normal operation of the refrigeration system it cannot be ensured that the extraction would result automatically due to the prevailing pressure conditions.

The combination of the condition in S507 and step S506, i.e., a further reduction in the working pressure pA, even if it is already below the pressure p_inak in the inactive line, can be referred to or understood as the second mode of active extract of refrigerant. The second mode results in accelerated extraction of refrigerant.

The use of the method is explained below by way of example on the basis of several examples of different operating modes of the refrigeration system 10.

In pure AC operation (cooling of the interior), the refrigerant flows actively in the primary line 14 from the refrigerant compressor 12 via the open primary line valve A4, the external heat exchanger 18, and the evaporator 22, with closed secondary line valve A3 and closed valves A1, AE1, and AE4. On the low-pressure side, that is to say downstream of the evaporator 22, a working pressure pA then results, which is usually lower than the pressure p_inak detected in the inactive line 16 by means of the sensor pT6. Correspondingly, in such a pure AC operation, the second mode of active extraction is generally considered, wherein the already lower working pressure pA is additionally lowered in order to extract more refrigerant from the inactive line 16 via the open shut-off valve A5.

In a heating mode with water heat pump function, the refrigerant flows actively in the secondary line 16 from the refrigerant compressor 12 via the open secondary line valve A3, the heat exchanger 26 (heating register) acting as a heat source, and the chiller 28 (water heat pump), with closed primary line valve A4 and closed valves AE2, AE3, and AE4. On the low-pressure side, that is to say downstream of the chiller 28, a working pressure pA then results, which is not necessarily lower than the pressure p_inak detected in the inactive line 14 by means of the sensor pT7. Accordingly, in such heating operation with water heat pump function, the first mode of active extraction is generally considered, wherein the working pressure pA is actively lowered in order to extract refrigerant from the inactive line 14 via the open shut-off valve A2.

Active extraction of refrigerant from an inactive line or area or section of the refrigeration system 10 is also possible in other operating states of the refrigeration system 10, for example also in the so-called reheating or reheat operation.

In principle, the method 500 presented here involves active and at least temporary adjustment of the low pressure level (working pressure pA), which is or comes to rest below the pressure level (pressure p_inak) in the inactive line or area.

In principle, it is to be noted that refrigerant can only be extracted and thus transferred from an inactive line or system section to an active one if the pressure level on the active system side is below the pressure level on the inactive system side and therefore the following applies as a prerequisite for extraction:

$$p\_ab < p\_inak$$

As already mentioned at the outset, it is once again noted here that the above-described method 500 can be used for any type of refrigeration system that has a system that has segmentable sections. The method can therefore be used both for a pure refrigeration system and for a system 10 described as an example having a heat pump and/or reheat function, so that advantages linked thereto can be positively utilized in an essentially deliberate manner A refrigeration system can be seen as the simplest variant, for example, which has a second evaporator line in the form of a chiller or evaporator subjected to air, wherein the additional or second line can be represented as segmentable.

The invention claimed is:

1. A method for operating a refrigeration system for a motor vehicle, wherein the refrigeration system comprises:
    a refrigerant compressor, which is connectable or connected to a primary line and a secondary line;
    a directly or indirectly acting external heat exchanger, which is arranged in the primary line;
    an evaporator, which is arranged in the primary line;
    at least one further heat exchanger which is arranged in the secondary line;
    a primary line valve arranged between the refrigerant compressor and the external heat exchanger;
    a secondary line valve arranged between the refrigerant compressor and the further heat exchanger;
    at least one valve device, which is arranged between a high-pressure-side section of the primary line or of the secondary line and a low-pressure-side line section upstream of the refrigerant compressor,
    the method comprises the following steps:
    setting an operating mode of the refrigeration system having active primary line and inactive secondary line or having active secondary line and inactive primary line;
    detecting the pressure in the inactive line, and comparing the pressure value in the inactive line with a value of static pressure resulting from an applied ambient temperature or from an applied coolant/fluid temperature;
    determining that the pressure value in the inactive line is greater than or equal to the static pressure, and, upon such determination, triggering activation of an extraction of refrigerant from the inactive line into the active line by lowering the pressure in the active line to a value below the pressure in the inactive line and by opening the at least one valve device; and
    after performing the extraction, determining that the pressure value in the inactive line is now less than the static pressure, and upon such determination, terminating the extraction.

2. The method according to claim 1, wherein the pressure in the active line is reduced starting from a working pressure level which is higher than the pressure in the inactive line.

3. The method according to claim 1, wherein the pressure in the active line is reduced further starting from a working pressure level which is lower than the pressure in the inactive line.

4. The method according to claim 2, wherein the pressure in the active line is kept at a pressure level which corresponds to a low-pressure limit permissible for the refrigeration system.

5. The method according to claim 1, wherein the activation of the extraction of refrigerant from the inactive line takes place when starting the refrigeration system or when restarting the refrigeration system in order to maximize the amount of refrigerant in the active line.

6. A refrigeration system having heat pump function for a motor vehicle, the refrigeration system comprises:
    a refrigerant compressor, which is connectable or connected to a primary line and a secondary line;
    a directly or indirectly acting external heat exchanger, which is arranged in the primary line;
    an evaporator, which is arranged in the primary line;
    at least one further heat exchanger which is arranged in the secondary line;
    a primary line valve arranged between the refrigerant compressor and the external heat exchanger;
    a secondary line valve arranged between the refrigerant compressor and the further heat exchanger;
    at least one valve device, which is arranged between a high-pressure-side section of the primary line or of the secondary line and a low-pressure-side line section upstream of the refrigerant compressor,
    at least two pressure sensors or pressure/temperature sensors, a pressure or pressure/temperature sensor being arranged in each of the high-pressure-side section of the primary line and the secondary line and which are configured, in an operating state having active primary line and inactive secondary line or having active secondary line and inactive primary line, to detect the pressure in the inactive line,
    wherein the system is configured to compare the pressure value in the inactive line with a value of static pressure resulting from an applied ambient temperature or from an applied coolant/fluid temperature,
    wherein the system is configured to, upon determination that the pressure value in the inactive line is greater than or equal to the static pressure, trigger an extraction of refrigerant from the inactive line into the active line by lowering the pressure in the active line to a value below the pressure in the inactive line and by opening the at least one valve device, and
    wherein the system is configured to, upon determination that the pressure value in the inactive line is less than the static pressure, terminate the extraction.

7. A motor vehicle that is at least partially electrically operated, having a refrigeration system according to claim 6.

8. The method according to claim 3, wherein the pressure in the active line is kept at a pressure level which corresponds to a low-pressure limit permissible for the refrigeration system.

9. The method according to claim 2, wherein the activation of the extraction of refrigerant from the inactive line takes place when starting the refrigeration system or when restarting the refrigeration system in order to maximize the amount of refrigerant in the active line.

10. The method according to claim 3, wherein the activation of the extraction of refrigerant from the inactive line takes place when starting the refrigeration system or when restarting the refrigeration system in order to maximize the amount of refrigerant in the active line.

11. The method according to claim 4, wherein the activation of the extraction of refrigerant from the inactive line takes place when starting the refrigeration system or when restarting the refrigeration system in order to maximize the amount of refrigerant in the active line.

* * * * *